(12) United States Patent
Storey et al.

(10) Patent No.: US 12,273,137 B2
(45) Date of Patent: Apr. 8, 2025

(54) PROTECTIVE SHELL FOR MOBILE DEVICE

(71) Applicant: GEORGE TFE SCP, Monaco (MC)

(72) Inventors: Piers Christian Storey, Nice (FR); John George Lloyd, Monaco (MC)

(73) Assignee: GEORGE TFE SCP, Monaco (MC)

( * ) Notice: Subject to any disclaimer, the term of this patent is extended or adjusted under 35 U.S.C. 154(b) by 473 days.

(21) Appl. No.: 17/910,827

(22) PCT Filed: May 1, 2021

(86) PCT No.: PCT/IB2021/053656
§ 371 (c)(1),
(2) Date: Sep. 11, 2022

(87) PCT Pub. No.: WO2021/224746
PCT Pub. Date: Nov. 11, 2021

(65) Prior Publication Data
US 2023/0097278 A1    Mar. 30, 2023

(30) Foreign Application Priority Data

May 4, 2020 (EP) .................................. 20020205

(51) Int. Cl.
*H04B 1/3888* (2015.01)
(52) U.S. Cl.
CPC ................. *H04B 1/3888* (2013.01)
(58) Field of Classification Search
CPC ....... H04B 1/3888; A45C 13/002; F16F 7/121
See application file for complete search history.

(56) References Cited

U.S. PATENT DOCUMENTS

| 8,706,176 B1 | 4/2014 | Jia et al. |
| 2017/0013925 A1* | 1/2017 | Fathollahi ............. A45C 13/02 |
| 2017/0163306 A1 | 6/2017 | Armstrong |

FOREIGN PATENT DOCUMENTS

| DE | 202017105141 U1 | 9/2017 |
| EP | 2728762 A2 | 5/2014 |
| KR | 101425977 B1 | 8/2014 |

\* cited by examiner

*Primary Examiner* — Marisol Figueroa
(74) *Attorney, Agent, or Firm* — Jason L DeFrancesco

(57) ABSTRACT

Protective shell (10) anchorable to a portable mobile device (20) comprising a honeycomb cellular structure (1) enclosed in a body (2) at least in part made of an elastic polymer, the body (2) comprising a back portion (9) configured to cover at least in part a backside (11) of the mobile device (20) and a side portion (12) configured to cover and fit with a sidewall (13) of the mobile device (20) so to anchor the body (2) to the mobile device (20); wherein said honeycomb cellular structure (1) comprises a plurality of open cells (3) connected each other via their sidewalls (14) to form at least a flexible sheet (15) configured to absorb energy through a deformation of said sidewalls (12) in response to a compressive load applied to said sheet (15); and wherein at least a part of the body (2) made of the elastic polymer fully encapsulates and permeates the open cells (3) of said honeycomb cellular structure (1).

17 Claims, 6 Drawing Sheets

PROTECTIVE SHELL FOR MOBILE DEVICE

TECHNICAL FIELD

The present invention relates to the field of protective shells for mobile devices. Preferably, it relates to protective covers for mobile phones, such as smartphones.

BACKGROUND ART

In the state of the art protective shells or covers for mobile devices or mobile equipments, such as mobile phones, remote controls, tablets, and similar devices are known. These kinds of covers or shells are normally made of plastic. These well-known covers protect the rear and lateral sides of a mobile device, leaving the front face accessible to operate the device.

EP2728762A2 describes a protective cover having a frontal movable closing cover embedding a reinforced plate for protecting the screen of a smartphone.

Document KR101425977 describes a mobile phone case, thus a casing of the mobile phone, made with a composite material comprising a honeycomb layer or a layer of foam. This document discloses a solution for substituting the existing mobile phone case with a reinforced one, having improved shock absorbing characteristics.

Available solutions do not efficiently absorb the energy from impacts. If a mobile device having a protective cover falls, the risk of damage to the internal components of the device is still very high.

Known elastomeric covers/shells are used to soften impacts by absorbing energy elastically, but elastic materials generate a rebound force during the impact that is transmitted to the inner components of the mobile device. This kind of force can consequently damage the mobile device even if its external shape is intact.

Furthermore, a solution that allows a quick inspection of the structural condition of such protective cover is absent.

Finally, a solution that solves the above-mentioned problems and has a nice appearance and an improved handgrip is desirable.

No one of the solutions available in the state of art solves all or substantially all said problems.

SUMMARY

Said inconvenients of the state of the art are now solved by a protective shell applicable to a mobile device for covering and protecting the mobile device comprising a honeycomb cellular structure enclosed in a body made at least in part of an elastic polymer. The honeycomb cellular structure is configured to absorb the energy of an impact. The body of said protective shell comprises a back portion configured to cover at least in part a backside of the mobile device and a side portion configured to cover and fit with a sidewall of the mobile device so to clamp the body to the mobile device. This protective shell is conceived for hand held and/or portable mobile devices and thanks to its honeycomb cellular layer the energy of an impact is absorbed efficiently. With this solution, a great portion of the impact energy is absorbed by the honeycomb cellular layer. Another part of said impact energy is elastically absorbed by the body. Said honeycomb cellular structure comprises a plurality of open cells connected each other via their sidewalls to form at least a flexible sheet configured to absorb energy through a deformation of said sidewalls in response to a compressive load applied to said sheet. This kind of honeycomb cellular layer efficiently absorbs a great quantity of the impact energy. Moreover, at least a part of the body made of an elastic polymer fully encapsulates and permeates the open cells of said honeycomb cellular structure. In this case, the honeycomb cellular sheet is embedded in a part of the body and the risks of a separation of said outer and inner layers is prevented. Furthermore, since the elastic polymer of the body fills the cells of the honeycomb cellular structure, the plastic buckling of its cells is laterally supported by the elastic polymer, synergically improving the absorption of impact energy. In addition, the honeycomb cellular structure so conceived acts as a mesh, spreading the impact load on a wider area, thus involving more cells in the energy absorption and a bigger portion of the elastic body. The surface of contact between the inner and outer surfaces of said open cells and the part of the body encapsulating them, is improved, consequently a disconnection between the honeycomb cellular structure and the body is more difficult or requires more energy.

Preferably, the body can be a single piece entirely made of said elastic polymer. In this case, the honeycomb cellular structure is fully encapsulated in this single piece of elastic polymer. In this embodiment, the honeycomb cellular structure is fully surrounded by one elastic body and a separation of these two elements is more difficult.

Alternatively, the body can comprise an outer layer, thus an outer piece, and an inner layer, thus an inner piece, connected to each other. These layers have different characteristics and provide a body more resistant to impacts.

In particular, at least one of the outer and inner layers enclosed the honeycomb cellular structure. One of the outer or inner layer is made of the elastic polymer and fully encapsulates the honeycomb cellular structure. The other layer can provide the overall shape of the protective shell, while the elastic inner layer containing the honeycomb cellular structure allows to absorb the energy of an impact in case the outer layer strikes against something.

In particular, the outer and inner layers can be shaped so that the inner face of the outer layer contacts at least in part the outer face of the inner layer and the inner face of the inner layer contacts the mobile device when the protective shell covers the mobile device. Preferably the outer layer can be connected to the inner layer by means of an adhesive layer. This arrangement of outer and inner layers segregates the functions of these two layers. The outer layer receives the impacts and consequently is more resistant to shock and scratches. While the inner layer is softer because it enters in contact with the mobile device.

Preferably, the outer layer can comprise at least a window configured to make the honeycomb cellular structure visible. In this way, the honeycomb cellular structure can be inspected easily and an eventual plastic deformation occurred after an impact can be immediately identified, without cutting or dismounting the protective shell.

Alternatively, the outer and inner layers can be shaped so to sandwich the honeycomb cellular structure encapsulated between them. In this manner, the honeycomb cellular sheet is always compressed between two other elements of the protective shell, and the cells can collapse like an accordion. Furthermore, lateral movements of the honeycomb cellular sheet are prevented.

In particular, the protective shell can also comprise a transparent element arranged between in correspondence of said at least a window. This transparent element protects the honeycomb cellular sheet without masking it.

In particular, the longitudinal axes of said cells can be normal to an outer or inner side of the protective shell. This arrangement of honeycomb cells allows to always maximize the quantity of energy absorbed by the honeycomb cellular layer by plastic crumpling of its cells.

Advantageously, the cross-sectional area of said cells can be comprised between 1.5 mm² and 10 mm². In this way the density of cells per centimetre squared is significant and the energy absorption improved. This small size of cells allows to have more cells lying on the critical portions of the mobile device. In this way, an impact received by the body is firstly plastically absorbed and subsequently spread on a wider area, thus involving more cells.

Preferably, the flexible sheet can have a thickness comprised between 0.5 and 3 mm, preferably equal to 1 mm. This size of the honeycomb cellular layer makes it flexible and bendable. In this way, the sheet can be easily adapted to curved portions of said body. Furthermore, these values of thickness allow to absorb impact energy through plastic deformation, guaranteeing compact dimensions of the protective shell.

Advantageously, the elastic polymer is a silicone or an elastomer, preferably a thermoplastic elastomer. These kinds of material allow to the honeycomb cellular structure to be encapsulated through a compression or drip moulding process.

Preferably, said elastic polymer can be of a transparent type. In this way, the honeycomb cellular structure remains always visible and any eventual plastic deformation to the honeycomb cellular structure is immediately detectable.

Advantageously, the honeycomb cellular structure can be arranged only in correspondence with said side portion. Since the lateral edges of a mobile device are normally one of the most vulnerable part, the honeycomb cellular structure is configured to protect this part.

Alternatively, the honeycomb cellular structure can be arranged in correspondence with said side portion and in correspondence with at least a part of said back portion. In this case, both lateral edge and backside of the mobile device are protected.

Finally, said body can comprises a knurled portion arranged on its external side, for improving the grip and for reducing the slipperiness of the protective shell over smooth surfaces.

These and other advantages will be better understood thanks to the following description of different embodiments of said invention given as non-limitative examples thereof, making reference to the annexed drawings.

DRAWINGS DESCRIPTION

DETAILED DESCRIPTION

The following description of one or more embodiments of the invention is referred to the annexed drawings. The same reference numbers indicate equal or similar parts. The object of the protection is defined by the annexed claims. Technical details, structures or characteristics of the solutions herebelow described can be combined with each other in any suitable way.

Figure 3:
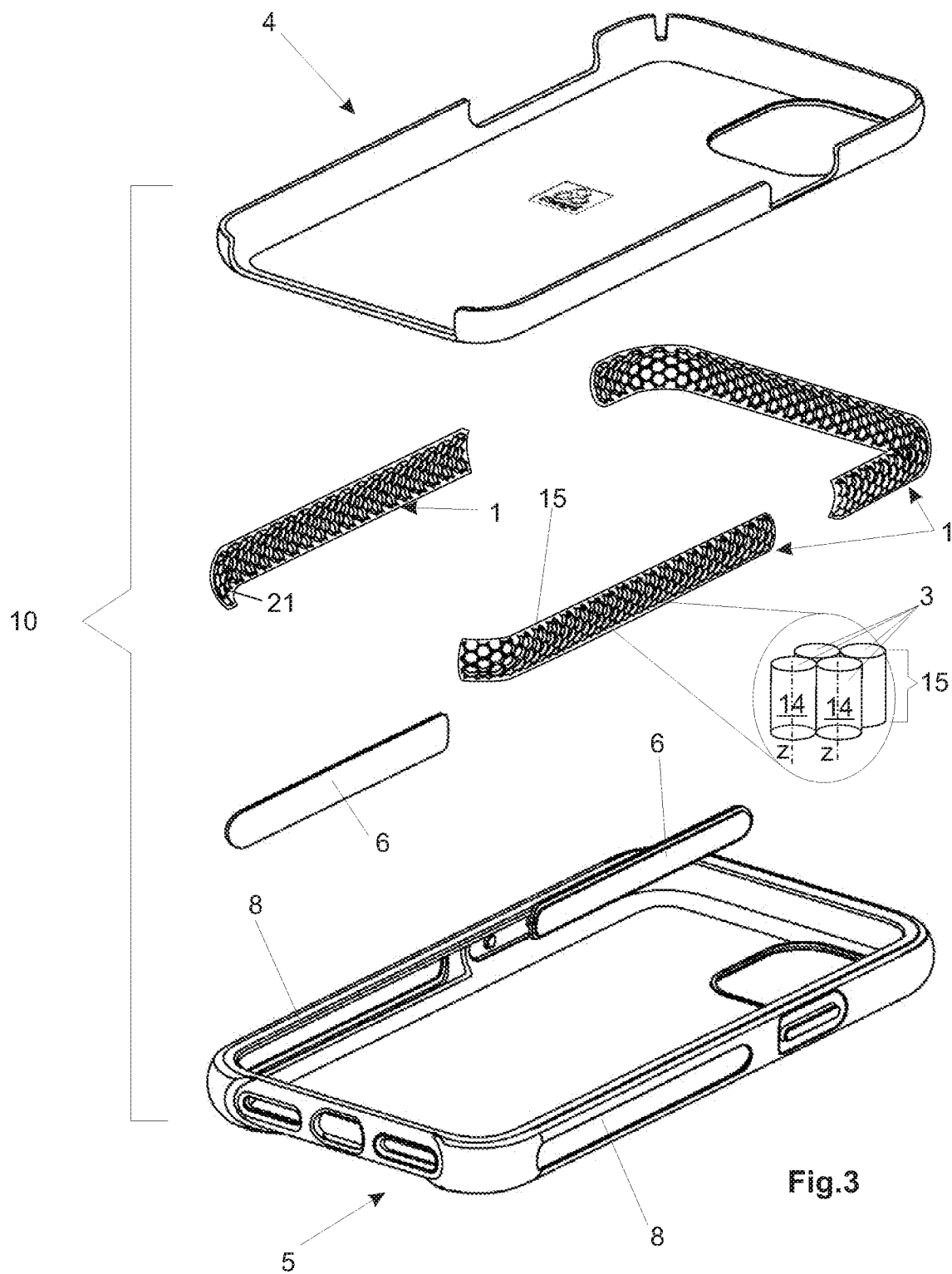
FIG. 3 shows an exploded view of a protective shell according to a first embodiment of the present invention.
Figure 4:
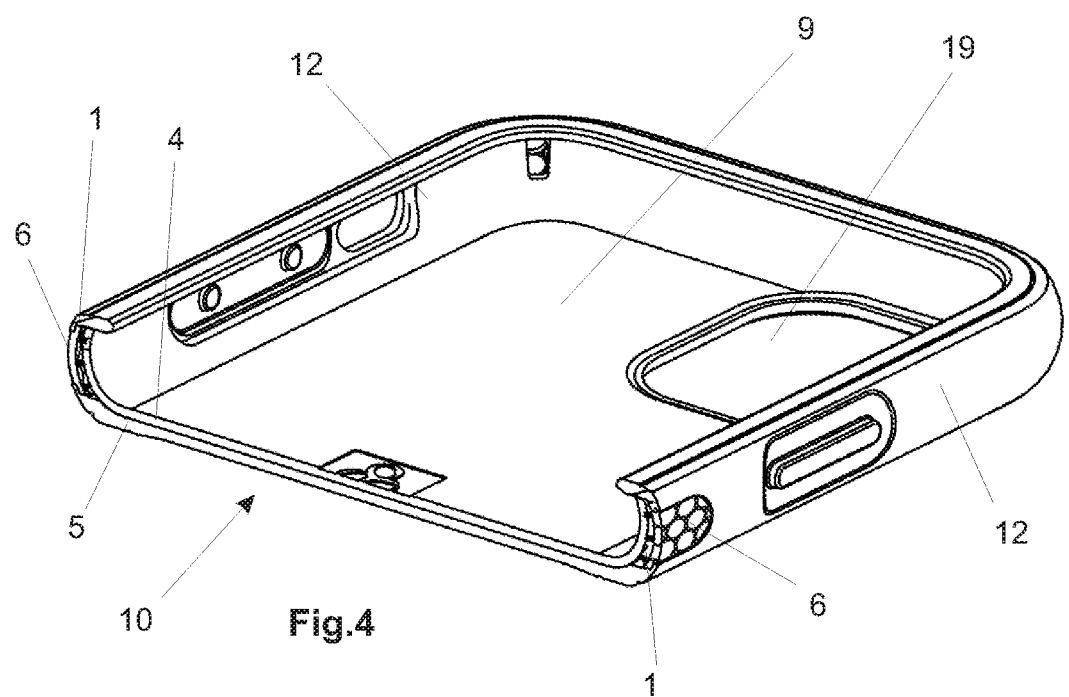
FIG. 4 shows a perspective view of a sectioned protective shell according to a first embodiment of the present invention.
Figure 5:
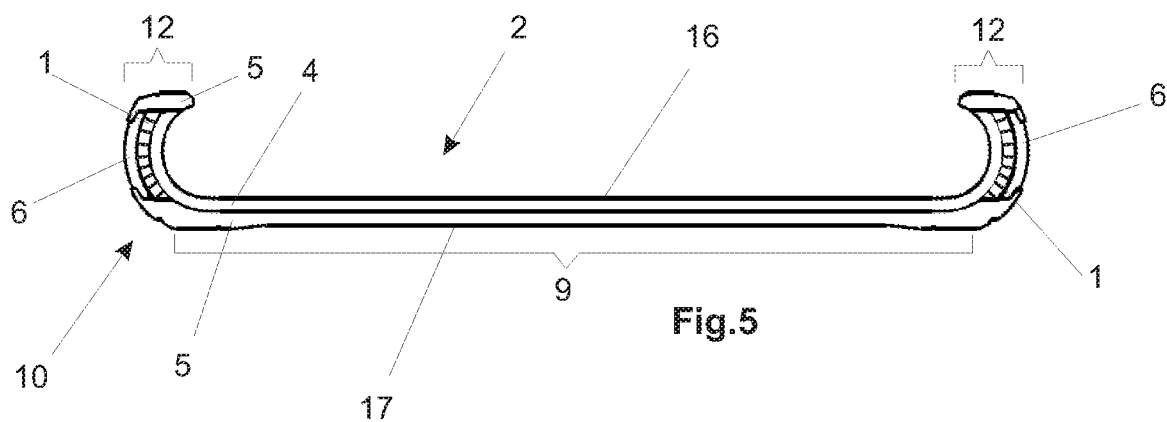
FIG. 5 shows a cross-sectional view of a protective shell according to a first embodiment of the present invention.
Figure 6:
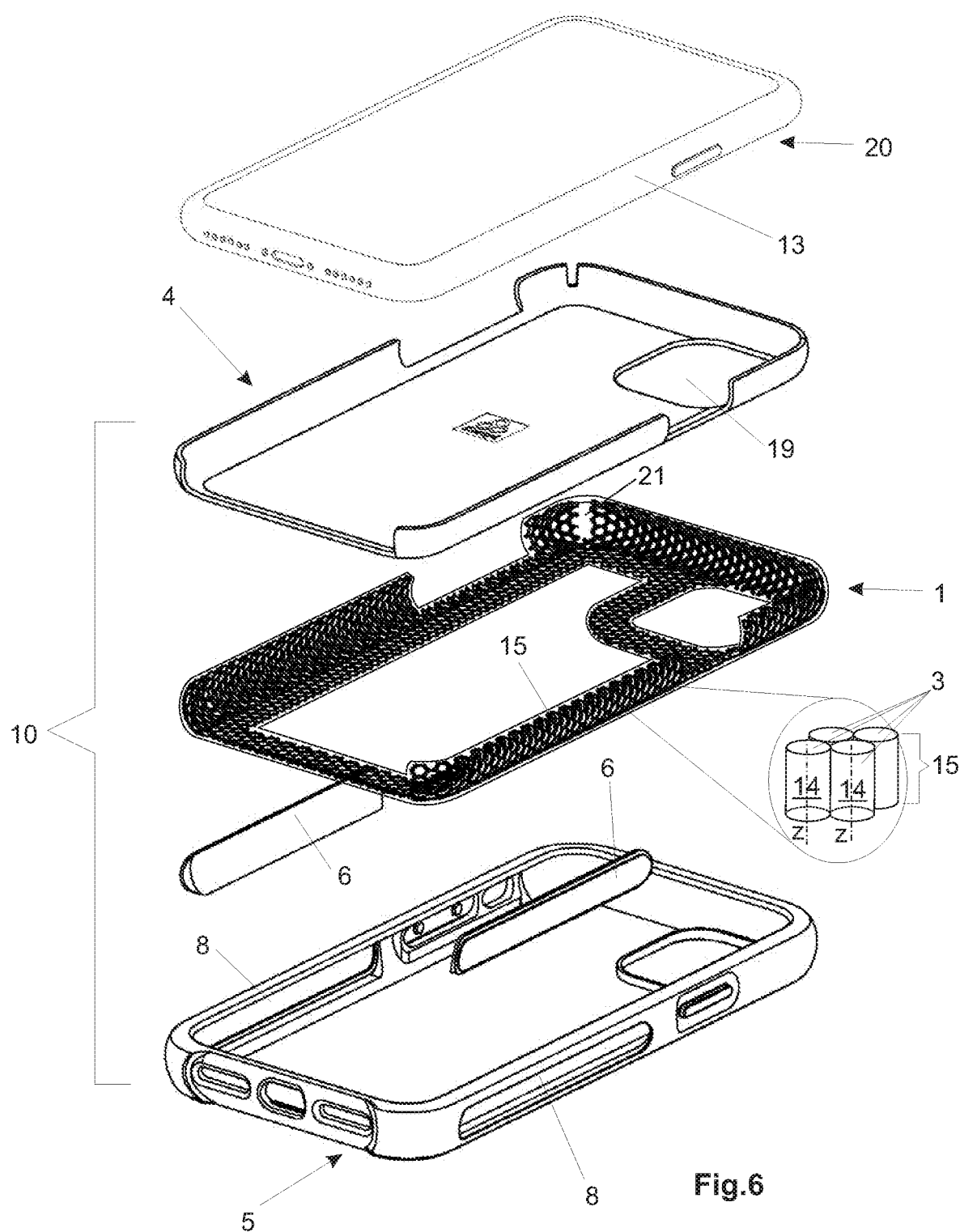
FIG. 6 shows an exploded view of a protective shell according to a second embodiment of the present invention.
Figure 7:
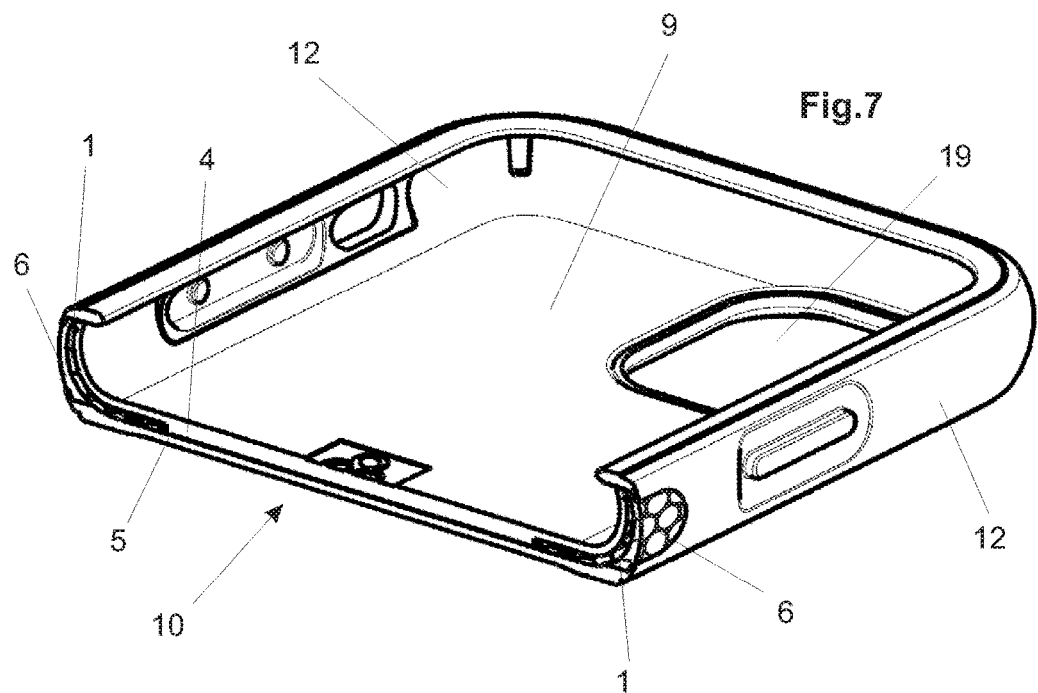
FIG. 7 shows a perspective view of a sectioned protective shell according to a second embodiment of the present invention.
Figure 8:
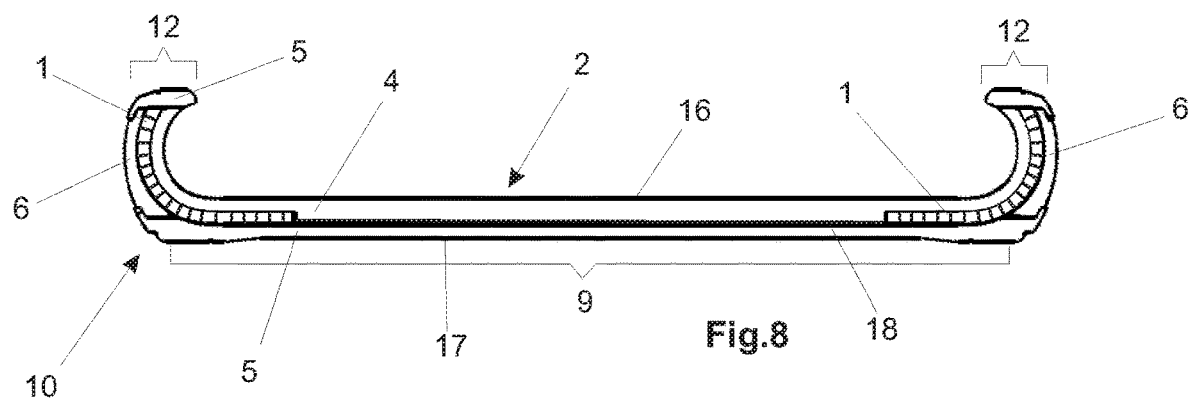
FIG. 8 shows a cross-sectional view of a protective shell according to a second embodiment of the present invention.
Figure 9:
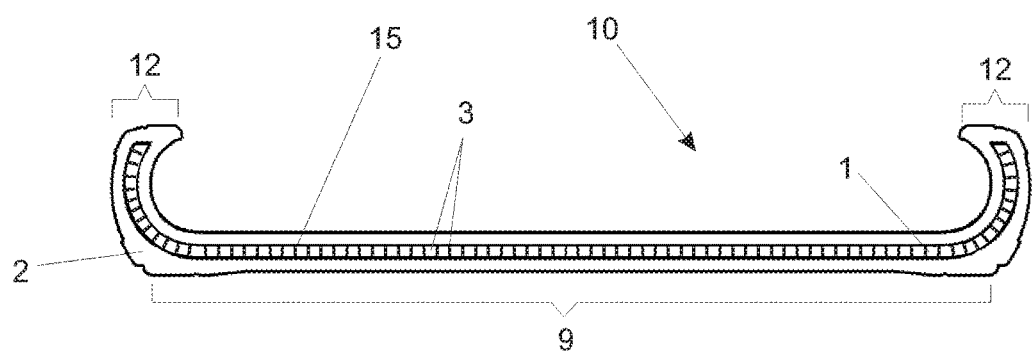
FIG. 9 shows a cross-sectional view of a protective shell according to a third embodiment of the present invention.
Figure 10:
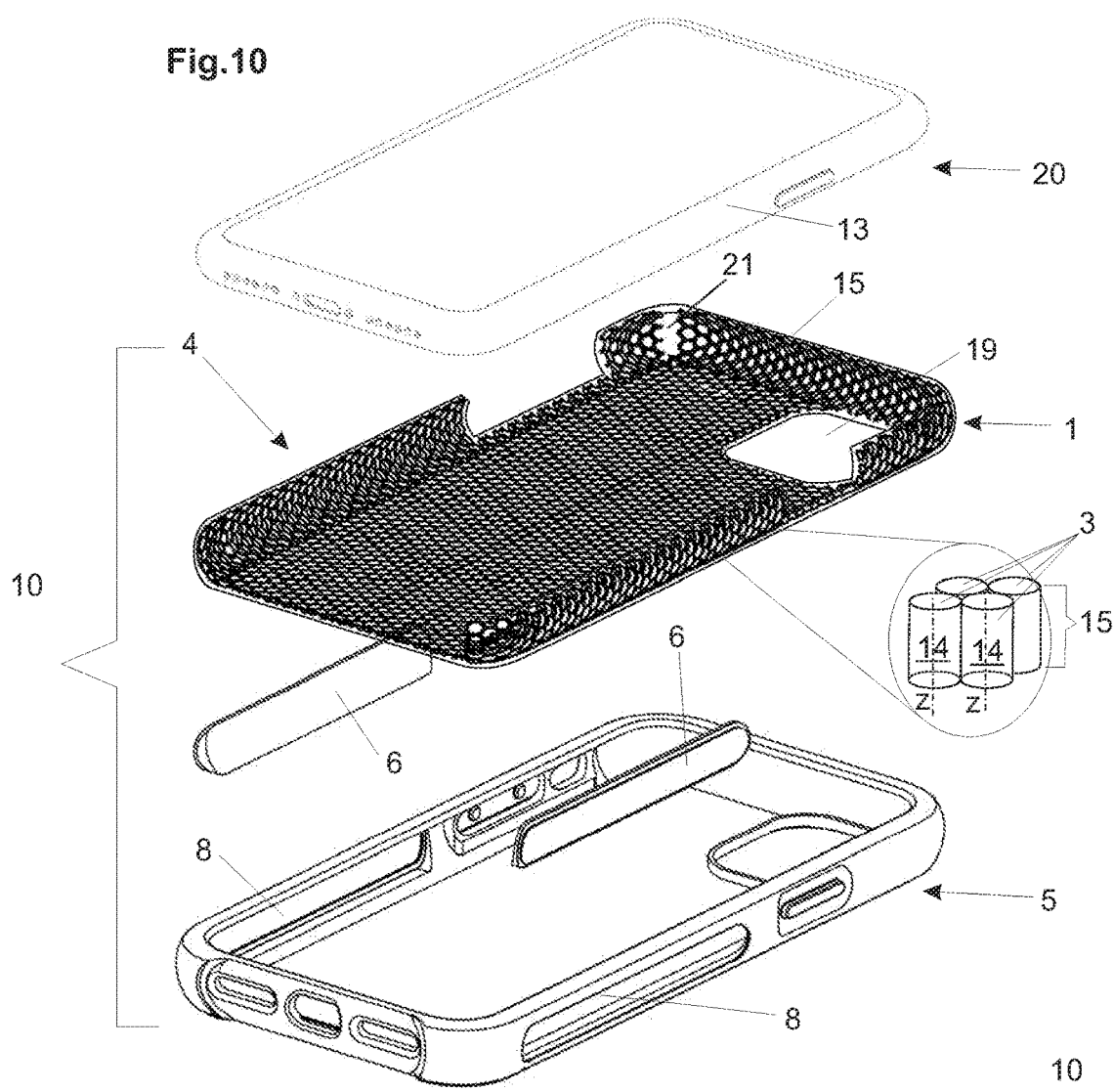
FIG. 10 shows an exploded view of a protective shell according to a fourth embodiment of the present invention.
Figure 11:
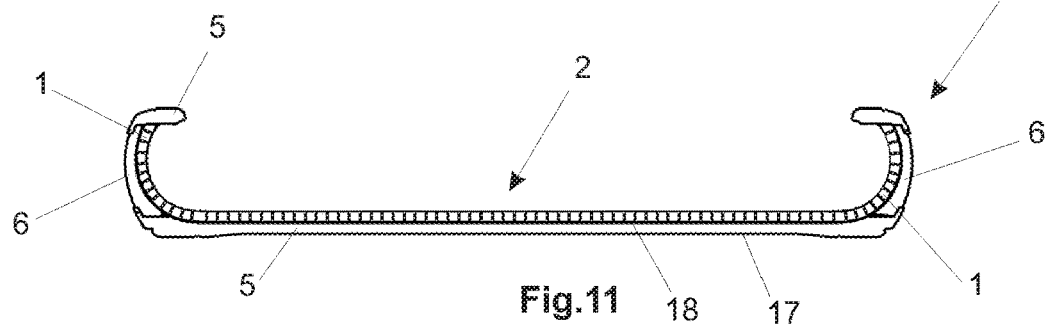
FIG. 11 shows a cross-sectional view of a protective shell according to a fourth embodiment of the present invention.
Figure 12:
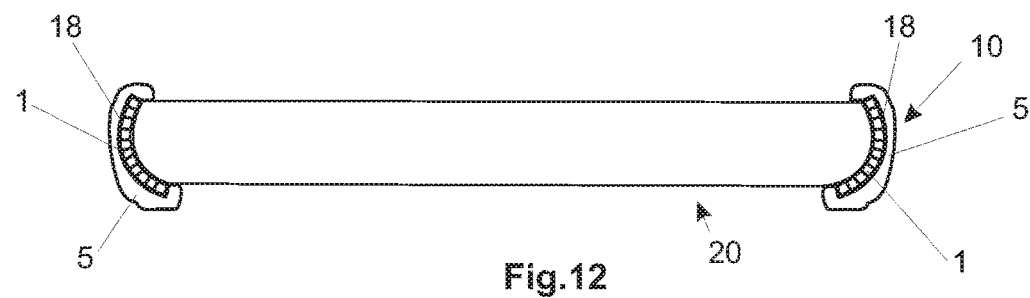
FIG. 12 shows a cross-sectional view of a protective shell according to a fifth embodiment of the present invention.

With reference to FIGS. 3 to 5 is represented a first embodiment of the protective shell 10. While in FIGS. 6 to 8 is represented a second embodiment of the protective shell 10. FIG. 9 represents a third embodiment of the protective shell 10, and FIGS. 10,11 represent a fourth embodiment of the protective shell 10. A fifth embodiment is represented in FIG. 12.

Figure 1:
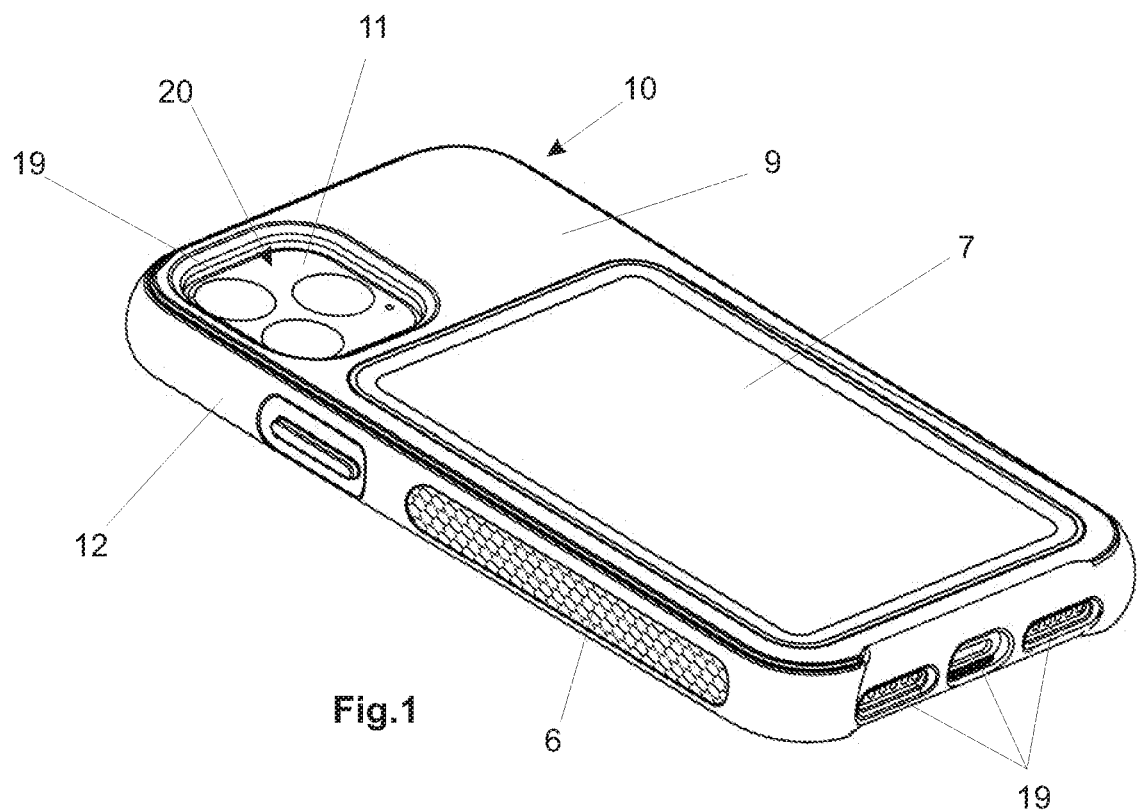
FIG. 1 shows a rear perspective view of a mobile device having a protective shell according to a first embodiment of the present invention.
Figure 2:
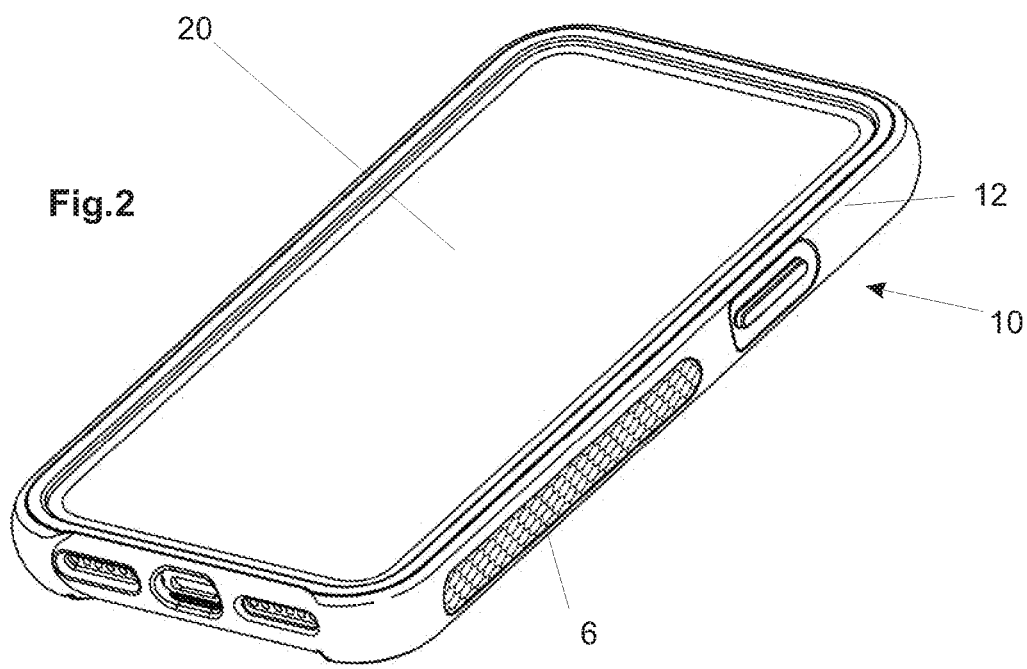
FIG. 2 shows a front perspective view of a mobile device having a protective shell according to a first embodiment of the present invention.

In particular, in FIGS. 1 and 2 is represented a protective shell 10 connected to a smartphone 20.

The protective shell 10 comprises a side portion 12 and a back portion 9. A side portion 12 of the protective shell 10 wounds and clamps the sidewall 13 of the mobile device 20, while its back portion 9 lies over the backside 11 of the mobile device 20. The back portion 9 can even be absent, like in a phone bumper.

The protective shell 10 comprises a plurality of passing-through apertures 19 for allowing the access to certain functionalities of the smartphone 20. For example, in FIG. 1 are represented passing through holes 19 for the camera, for the speakers and for the charging plug.

In FIG. 1 is also visible a knurled portion 7 which allows an improved grip with a user's hand. In particular, in FIGS. 1 and 2 is visible the body 2 of the protective shell and, through the transparent element 6, the honeycomb cellular structure 1.

The body 2 of the protective shell 1 can comprise one or more layers. For example, in the first and second embodiments the layers are three, in the third embodiment the body 2 as only one layer, while in the fourth and fifth embodiments the body 2 comprises two layers.

With reference to FIG. 3 is represented the protective shell 10 according to said first embodiment in an exploded view, so that all elements constituting the protective shell 10 are clearly discernible.

An inner layer 4 is shown on the top of FIG. 3 and represents the inner part of the body 2. This inner layer 4 is in contact with the smartphone 20 when the smartphone 20 is inserted in the protective shell 10. Since this part of the body 2 is in contact with the smartphone 20 is preferably made of a smooth and soft material, like a microfiber layer. This microfiber layer can be a fabric made of microfiber yarns or a composite material including microfibers for being more resistant to impacts.

Below the inner layer 4 is represented the honeycomb cellular structure 1 embedded in an elastic polymer item, which comprises a plurality of interconnected open cells 3 arranged so to form a sheet 15. The cells 3 are all oriented so to be normal to the inner side of the protective shell 10. In the following, in particular with reference to the first, second, fourth and fifth embodiments, the term "honeycomb cellular structure" refers to the composite element constituted by the honeycomb cellular structure 1 and the part 21 of the body 2 made of the elastic polymer that fully encapsulates and permeates the open cells 3 of said honeycomb cellular structure 1. This composite element realizes a layer of the body 2 of the protective shell 1.

The interconnection and the architecture of this composite element in described in detail in the following.

The cells 3 are connected to each other through their sidewalls 14 as shown in the detailed view of FIG. 3.

In the embodiment of FIG. 3, the sheets 15 of cells constituting the honeycomb cellular structure 1 are three and are shaped and disposed so to lie in correspondence with the side portion of the protective shell 1. Indeed, these sheets 15 are shaped so to wrap the right, left and top sides of the smartphone 20, when it is accommodated in the protective shell 10.

Finally, the protective shell 10 comprises an outer layer 5, represented in the bottom part of FIG. 3, which externally looks like a traditional phone case, but internally comprises a plurality of recesses shaped so to receive the transparent elements 6. This outer layer 6 is preferably made of a hard plastic polymers such as polycarbonate (PC) or an elastic polymer such as thermoplastic polyurethane (TPU) or silicone.

In particular, the elastic polymer covering the honeycomb cellular structure 1 can be a transparent silicon, a transparent thermoplastic elastomer, like that known under the commercial name Phonix™, or a clear urethane rubber, like that known under the commercial name ClearFlex™ The fact of being transparent or clear, facilitates seeing the honeycomb cellular structure 1 without dismounting the protective shell 10.

With reference to FIGS. 4 and 5, it is represented the protective shell 10 of the first embodiment transversally cut. In this FIG. 4 are visible all the elements of the protective shell 10.

In particular, the inner layer 4 is inserted and mechanically coupled into the outer layer 5. Since the outer face of the inner layer 4 matches with the inner face of the outer layer 5, they snap-fit into each other.

As shown in FIG. 5, the edge of the main aperture of the outer layer 5 holds the inner layer 4, preventing it from escaping.

The honeycomb cellular structure 1 is clamped between the inner layer 4 and the outer layer 5, so to remain sandwiched between them.

The inner layer 4, in particular its outer face, is shaped so to accommodate the honeycomb cellular structure 1. In a particular version, not shown, the recesses for accommodating the honeycomb cellular structure 1 are realized on the outer layer 5 instead of on the inner layer 4.

The honeycomb cellular structure 1 is also covered by the transparent elements 6, that are arranged in the windows 8 of the outer layer 5.

In FIG. 5 is clearly perceivable that honeycomb cellular structure 1 is arranged only in correspondence with side portions 12 of the body 2. The same applies to the embodiment of FIG. 12. The sidewall 13 of the mobile device 20 is probably the most sensible part of the device 20, and if an impact occurs on the corner, the screen of the mobile device 20 will surely break. The honeycomb cellular structure 1 arranged on the side portion 12 of the body 2 allows to absorb the energy of an impact, preventing this kind of damage to the mobile device 20.

The honeycomb cellular structure 1 comprises a plurality of cells 3 normally oriented with respect to the inner side 16 of the protective shell 10, which corresponds to the inner face of the inner layer 4. The longitudinal axes Z of these cells 3 are also, in part, normal to the outer side 17 of the protective shell 10, which corresponds to the outer face of the outer layer 5.

The second embodiment represented in FIG. 6 is substantially equal to the above-described first embodiment represented in FIG. 3, a part from a differently shaped honeycomb cellular structure 1.

The single sheet 15 of the honeycomb cellular structure 1 of FIG. 6, is shaped so to lie in correspondence with the side portion 12 and in correspondence with a part of the back portion 9. In particular, the sheet 15 covers the perimeter of the back portion 9 and surrounds the hole 19 for the smartphone camera.

A part from this difference the outer face of the inner layer 4 is shaped differently, but this difference is only perceivable in FIG. 8. In FIG. 6 is also represented the smartphone 20.

The description of the first embodiment represented in FIGS. 4 and 5 applies also to FIGS. 7 and 8, because the embodiments are substantially equal except for the overall shape of the honeycomb cellular structure 1 and for the shape of the outer face of the inner layer 4, shown in FIG. 8.

As already said for FIG. 6, the second embodiment comprises a honeycomb cellular structure 1 having a single sheet 15. This sheet 15 lies in correspondence with the side and back portions of the protective shell 10. In particular, this sheet 15 covers all the sidewall 13 of a smartphone insertable in the protective shell 10. Furthermore, this sheet 15 covers the perimeter of smartphone backside 11. In this way, in case of an impact, the elastic rebounding force over the backside 11 or sidewall 13 of the smartphone 20 are prevented by the honeycomb cellular structure 1 that absorbs this kind of force. In this way, this force is not transmitted to the inner components of the mobile device.

The inner layer 4 is shaped so to accommodate the honeycomb cellular structure 1. In a particular version, not shown, the recess for accommodating the honeycomb cellular structure 1 can be realized on the outer layer 5 instead of on the inner layer 4.

In this second embodiment, the inner and outer layers 4,5 are not only mechanically coupled to each other, as in the first embodiment, but an adhesive layer 18 is added between them to achieve a firm coupling of these layers.

The adhesive layer 18 can be also arranged between the honeycomb cellular structure 1 and the inner layer 4 or the outer layer 5 for maintaining in position the honeycomb cellular structure 1 during an impact.

With reference to FIG. 9 is represented a third embodiment of the protective shell 10, wherein the body 2 is a single piece of elastic polymer. The body 2 fully encapsulates the honeycomb cellular structure 1. Even if it's not perceivable in FIG. 9, the elastic polymer fills the cells 3 of the honeycomb cellular structure 1.

In particular, the elastic polymer can be a polymer resin, for example a transparent silicon resin, that is poured into and around the open cells 3 of the honeycomb cellular structure 1. Once the elastic polymer resin solidifies, the article obtained is a body 2 encapsulating the honeycomb cellular structure 1.

The elastic polymer can also be a polymer like that described for first embodiment, thus TPU, silicone or they like.

The same applies to the part 21 of the body made of the elastic polymer that fully encapsulates and permeates the open cells 3 of said honeycomb cellular structure 1 of the other embodiments. The elastic polymer can be poured around and into the open cells 3 so to form this energy-absorbing layer enclosing the honeycomb cellular structure 1.

In this embodiment, since the body 2 completely covers the honeycomb cellular structure 1, it is preferable to have a body 2 made of an elastic polymer that is transparent or clear, for allowing an inspection of the honeycomb cellular structure 1 from outside. The transparent or clear material can be the same as described for the first embodiment. These transparent or clear elastic polymers, a part from allowing an inspection of the honeycomb cellular structure 1 from outside, improves the appearance and the distinguishability of the product among a multitude of similar shells. This fact applies to all the embodiments of this invention.

The third embodiment of FIG. 9 is only represented in the cross-sectional view because the overall shape of the protective shell 10 does not change with respect to the other embodiments, consequently reference can be made to FIGS. 1 and 2 for the other details.

In this third embodiment the cells are normally oriented with respect to the inner side 16 of the body 2 and to the outer side 17 of the back portion 9.

In this third embodiment, the honeycomb cellular structure 1 is a single sheet 15 lying in correspondence with both back and side portions 9,12 of the protective shell 10. In this way, backside 11 and sidewall 13 of the mobile device are fully protected.

In an alternative embodiment (not represented), a layer can be arranged, during the forming process, over the open sides of the cells 3 for avoiding that elastic polymer of the body 2 enters in the cells 3 of the honeycomb cellular structure 1. In this case, the cells 3 remains void and the elastic polymer only wounds the external shape of the honeycomb cellular structure 1.

With reference to FIGS. 10 and 11, it's represented a fourth embodiment of the protective shell 10. This embodiment differs from the two embodiment of FIGS. 6 and 8 because the honeycomb cellular structure 1 lies in correspondence with both back and side portions 9,12.

Moreover, this embodiment differs from all the others, because the protective shell 1 comprises an outer layer 5 and the honeycomb cellular structure 1 encapsulated in the part 21 of the body 2 made of elastic polymer. In this embodiment, the inner layer 4 substantially corresponds to the encapsulated honeycomb cellular structure 1, therefore the honeycomb cellular structure 1 is enclosed in the inner layer 4. In an alternative embodiment (not represented), the outer layer 5 encapsulates the honeycomb cellular structure 1.

The single sheet 15 of interconnected open cells 3 is curved and shaped so to assume substantially the same shape of the inner surface of the outer layer 5. The encapsulated sheet 15 is connected to the inner surface of the outer layer 5.

The inner composition of this sheet 15 is equal to that of previous embodiments, but its overall size is wider and similar to that of third embodiment.

The outer layer 5 is made of a semi-rigid material, for example polycarbonate, and constitutes the frame of the body 2 on which the encapsulated honeycomb cellular structure 1 is connected.

This single sheet 15 of the honeycomb cellular structure 1 is attached by means of adhesive layers 18 arranged on the part 21 facing towards the outer layer 5, with the exception of the areas wherein the transparent elements 6 is arranged, thus in correspondence with the windows 8.

In this fourth embodiment, like in all previous embodiments, the cells are oriented so that their longitudinal axes Z are normal to the inner side 16.

The inner face of the outer layer 5 is attached to the honeycomb cellular structure 1, as shown in FIG. 11.

In the fifth embodiment, the back portion 9 of the body 2 is substantially absent because covers only the rim of the backside 11 of the mobile device 20. The body 2 comprises a side portion 12 that surrounds the sidewall 13 of the mobile device 20, as shown in FIG. 12. The outer layer 5 of the body is made of an elastomeric material and is connected to said encapsulated honeycomb cellular structure 1. The connection between the outer layer 5 and the honeycomb cellular structure 1 is realized through an intermediate adhesive layer 18.

The windows 8 of the outer layer 5 can be absent in the previous embodiments.

The adhesive layer of previously described embodiments can be a layer of glue or a layer capable of sticking both sides. The adhesive layer can be a pressure sensitive adhesive.

The elastic polymer material encapsulating the honeycomb cellular structure 1, allow to elastically absorb the energy of an impact. This kind of absorption is efficient for small impacts but generates rebounding forces in case of stronger impacts. For this reason, the thin sheet of honeycomb cellular structure 1 plastically absorbs the residual impact energy transferred by the elastic polymer element to the underlying honeycomb cellular structure 1. The plastic deformation of the sheet 15 can involve a deformation of the sidewalls 14 of the open cells 3 or a deformation of the bonding of neighbour interconnected open cells 3.

The honeycomb cellular structure 1 also allows to spread the impact energy over a wider area, acting as a mesh.

Similarly, when the inner layer 4 is present, the inner layer 4 absorbs the residual part of the impact energy, spreading the energy over a wider portion of the mobile device 20, avoiding a concentration of forces on a small area.

If the cells 3 of honeycomb cellular structure 1 buckles and/or deforms plastically, the honeycomb cellular structure 1 is compromised and the protective shell 10 is no more able to efficiently absorb the energy of an impact. In this case, the protective shell 10 needs to be substituted or the honeycomb cellular structure 1 changed. This kind of deformation is immediately perceivable thanks to the fact that the elastic polymer is transparent or clear, and also thanks to the transparent element/s 6.

In all embodiments the honeycomb cellular structure 1 is composed by a plurality of open cells 3. Each open cell 3 comprises sidewall 14 and open ends. In this way, each cell 3 defines a channel going from one open end to the opposite open end. Each cell 3 is connected by means of its sidewall 14 to the neighbouring cells 3, and each cell 3 has a longitudinal axis Z.

The sidewalls 14 of said cells 3 is made of plastic, preferably a thermoplastic like polycarbonate. This kind of material deforms plastically in case of an axial compression of said cells 3. Specifically, the sidewall 14 of the cell 3 buckles like an accordion and the sidewall 14 plastically and irreversibly deforms.

In particular, the cells 3 represented in all embodiments are cylindrical open tubes, but even different cross-sectional shapes of the cells 3 can be employed. For example, the cross-section of the cells 3 can be a square, a hexagon, a non-uniform hexagon, a re-entrant hexagon, a chiral truss, a diamond, a triangle, an arrowhead, or a Kagome shape. In this way, the honeycomb cellular structure 1 can be synclastic or anticlastic. Furthermore, the cells 3 can compose an auxetic structure.

Furthermore, the sidewalls 14 can be individual for each cell 3 or share between more cells 3. The honeycomb cellular structure 1 is about 1 mm thick and the thickness of the sidewalls 14 is comprised between 0.06 mm and 0.18 mm, preferably about 0.1 mm. This small value of the sidewalls 14 thickness allows a buckling despite the short height of the cells 3.

With reference to the above, the honeycomb cellular structure 1 is embedded in an elastic polymeric part 21 of the body 2, preferably made of silicone or an elastomeric material. A sheet 15 of cells 3 is encapsulated in a layer made of an elastic polymer, so that this material permeates, covers and wraps the honeycomb cellular structure 1.

Basically, a sheet 15 of cells 3 is arranged in a mould and a quantity of elastic polymer, like a silicone, is poured and compressed over and into the open cells 3 of honeycomb cellular structure 1. In this way, the honeycomb cellular structure 1 and elastic polymer become a single element.

The elastic polymer part 21 fills and slightly cover the honeycomb cellular structure 1, so that their union provides a composite element having substantially the same dimension and shape of the honeycomb cellular structure 1 alone, but having flat and smooth surfaces.

This composite element has inner and outer surfaces that are broader than the surfaces of the edges of said opens cells 3. In this way, the adhesive layer acts on a wider surface and provides a stronger bonding with the other layers 4,5 of the protective shell 1.

Moreover, the elastic material absorbs the energy of an impact elastically, while the honeycomb cellular structure 1 absorbs the energy of an impact through a permanent deformation. This permanent deformation of cells 3 also allows to absorb the rebounding forces generated by the elastic part 21.

This composite element is used in the first, second, fourth and fifth embodiments. Furthermore, this composite element substantially looks like the honeycomb cellular structure 1 of FIGS. 3, 6 and 11, because the elastic material is transparent or clear.

With reference to the third embodiment, the part 21 of the body 2 substantially includes the entire body 2, thus without inner and outer layers 4,5.

Concluding, the invention so conceived is susceptible to many modifications and variations all of which fall within the scope of the inventive concept, furthermore all features can be substituted to technically equivalent alternatives. Practically, the quantities can be varied depending on the specific technical requirements. Finally, all features of previously described embodiments can be combined in any way, so to obtain other embodiments that are not herein described for reasons of conciseness and clarity.

The invention claimed is:

1. Protective shell anchorable to a portable mobile device comprising a honeycomb cellular structure enclosed in a body at least in part made of an elastic polymer, the body comprising a back portion configured to cover at least in part a backside of the mobile device and a side portion configured to cover and fit with a sidewall of the mobile device so to anchor the body to the mobile device;
   wherein said honeycomb cellular structure comprises a plurality of open cells connected each other via their sidewalls to form at least a flexible sheet configured to absorb energy through a deformation of said sidewalls in response to a compressive load applied to said sheet; and
   wherein at least a part of the body made of the elastic polymer fully encapsulates and permeates the open cells of said honeycomb cellular structure.

2. Protective shell according to claim 1, wherein the body is a single piece entirely made of said elastic polymer.

3. Protective shell according to claim 1, wherein the body comprises an outer layer and an inner layer connected to each other.

4. Protective shell according to claim 3, wherein the outer and inner layers are shaped so to sandwich the honeycomb cellular structure between them.

5. Protective shell according to claim 3, wherein at least one of the outer and inner layers enclosed the honeycomb cellular structure.

6. Protective shell according to claim 3, wherein the outer layer comprises at least a window configured to make the honeycomb cellular structure visible from outside.

7. Protective shell according to claim 6, further comprising a transparent element arranged in correspondence with said at least a window.

8. Protective shell according to claim 1, wherein longitudinal axes of said cells are normal to an outer or inner side of the protective shell.

9. Protective shell according to claim 1, wherein the cross-sectional area of said cells is comprised between 1.5 $mm^2$ and 10 $mm^2$.

10. Protective shell according to claim 1, wherein said flexible sheet has a thickness comprised between 0.5 and 3 mm, preferably equal to 1 mm.

11. Protective shell according to claim 1, wherein said elastic polymer is a silicone or an elastomer, preferably a thermoplastic elastomer.

12. Protective shell according to claim 1, wherein said elastic polymer is of a transparent type.

13. Protective shell according to claim 1, wherein the honeycomb cellular structure is arranged only in correspondence with said side portion.

14. Protective shell according to claim 1, wherein the honeycomb cellular structure is arranged in correspondence with said side portion and in correspondence with at least a part of said back portion.

15. Protective shell according to claim 1, wherein said body comprises a knurled portion arranged on its outer side.

16. Protective shell according to claim 10, wherein said flexible sheet has a thickness equal to 1 mm.

17. Protective shell according to claim 11, wherein said elastic polymer is a thermoplastic elastomer.

* * * * *